(12) United States Patent
Wang et al.

(10) Patent No.: US 8,169,433 B2
(45) Date of Patent: May 1, 2012

(54) APPARATUS AND METHOD FOR THREE-DIMENSIONAL MODEL RETRIEVAL

(75) Inventors: Yuehong Wang, Beijing (CN); Rujie Liu, Beijing (CN); Takayuki Baba, Kawasaki (JP); Susumu Endo, Kawasaki (JP); Shuichi Shiitani, Kawasaki (JP); Yusuke Uehara, Kawasaki (JP); Daiki Masumoto, Kawasaki (JP); Shigemi Nagata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 656 days.

(21) Appl. No.: 12/219,311

(22) Filed: Jul. 18, 2008

(65) Prior Publication Data

US 2009/0040225 A1 Feb. 12, 2009

(30) Foreign Application Priority Data

Jul. 20, 2007 (CN) .......................... 2007 1 0136197

(51) Int. Cl.
*G06T 15/00* (2011.01)
*G06T 15/10* (2011.01)

(52) U.S. Cl. ........................................ 345/419; 345/427

(58) Field of Classification Search .................. 345/418, 345/419, 427
See application file for complete search history.

(56) References Cited

U.S. PATENT DOCUMENTS

| 6,914,618 | B2 * | 7/2005 | Weiss ............................ | 345/649 |
| 7,212,664 | B2 * | 5/2007 | Lee et al. ...................... | 382/154 |
| 7,436,988 | B2 * | 10/2008 | Zhang et al. .................. | 382/118 |
| 2008/0021882 | A1 * | 1/2008 | Pu et al. ........................ | 707/3 |
| 2008/0309669 | A1 * | 12/2008 | Choi et al. .................... | 345/427 |
| 2010/0045677 | A1 * | 2/2010 | Morel ............................ | 345/427 |
| 2010/0076959 | A1 * | 3/2010 | Ramani et al. ................ | 707/722 |

OTHER PUBLICATIONS

R. Osada et al., "Shape Distributions", ACM Transactions on Graphics, vol. 21, No. 4, Oct. 2002; pp. 807-832.

M. Hilaga et al., "Topology Matching for Fully Automatic Similarity Estimation of 3D Shapes", SIGGRAPH, Aug. 2001; pp. 203-212.

D.Y. Chen et al., "On Visual Similarity Based 3D Model Retrieval", European Association for Computer Graphics, vol. 22, No. 3, 2003; pp. 223-232.

T.F. Ansary et al., "A Framework for 3D Objects Retrieval from 2D Images" Annals of telecommunications technologies and tools for 3D imaging. vol. 60 (11-12), 2005.

P. Shilane et al., "The Princeton Shape Benchmark", Proceedings of the Shape Modeling International 2004; pp. 1-12, 384.

N. Iyer et al., "An Engineering Shape Benchmark for 3D Models", ASME IDETC/CIE, 2005; pp. 1-9.

* cited by examiner

*Primary Examiner* — Michelle K Lay
*Assistant Examiner* — Leon T Cain, II
(74) *Attorney, Agent, or Firm* — Staas & Halsey LLP

(57) ABSTRACT

The present invention relates to three-dimensional model retrieval apparatus and method. The three-dimensional model retrieval apparatus according to the present invention comprises a model normalizing unit for rotating and/or translating a three-dimensional model so that main axis directions of the three-dimensional model are consistent with coordinate axes of a system coordinate system, and barycenter of the three-dimensional model is consistent with origin of the system coordinate system; a two-dimensional image generating unit for projecting said three-dimensional model respectively in a positive direction and a negative direction of each coordinate axis of said system coordinate system to generate a plurality of two-dimensional images; a model describing unit for generating a model descriptor of the three-dimensional model from said two-dimensional images; and a retrieving unit for retrieving, based on said model descriptor, a three-dimensional model which most matches an input query from a model database.

17 Claims, 8 Drawing Sheets

APPARATUS AND METHOD FOR THREE-DIMENSIONAL MODEL RETRIEVAL

FIELD OF THE INVENTION

The present invention relates to three-dimensional model retrieval, and more particularly to three-dimensional model description and retrieval technologies based on two-dimensional images.

BACKGROUND OF THE RELATED ART

With recent advances in three-dimensional data acquisition techniques, computer aided design (CAD) techniques and graphics hardware, an increasing amount of three-dimensional models spread over various archives, such as the Internet and specific databases. On the other hand, designing of high fidelity three-dimensional models is both very costly and time consuming. Therefore, effective exploitation of existing models becomes important, but it is difficult to retrieve useful models from the huge amount of collections. Many efforts have been made by scholars to find efficient three-dimensional model retrieval approaches.

Various methods have been so far proposed for three-dimensional model retrieval, and they can be broadly divided into two classes: key words based retrieval method and content based retrieval method. In the former kind of methods, the three-dimensional model is described in the semantic level and the feature of the model is expressed with a series of descriptive words, such as size, material, color or category. They are applicable in early stage when the size of collections of three-dimensional models is small. In the latter kind of methods, content of the model itself is taken into consideration during the model retrieval process. With sharp increase in the number of the models, more and more attention is focused on content based retrieval techniques. The currently available content based retrieval methods can be classified into three categories: feature vector based method, topology based method and two-dimensional images based method.

In feature vector based methods, a feature vector is used to describe a three-dimensional object. Shape distribution is the best known method of this kind. Refer to Non-patent document 1 for details of the shape distribution method. Methods of this kind have very high efficiency in feature extraction and model comparison. However, the retrieval precision is not satisfactory because the feature vector is relatively simple and the information of the model is not precisely described. Nonetheless, these methods may be integrated into other methods as a pre-classifier due to their simplicity and efficiency.

In topology based retrieval methods, the structure of the three-dimensional model is described using tree or graph, and the comparison of two models is accomplished by matching two trees or graphs; refer to Non-patent document 2 for details. Topological structure provides intuitive and important information of the shape of a three-dimensional model, and such feature is invariant of affine transformation. However, topology is sensitive to tiny changes in the model and topology matching of trees and graphs is too time-consuming, and these defects restrict the application of such kind of methods.

In two-dimensional images based retrieval methods, a series of two-dimensional images are generated based on three-dimensional models, and the three-dimensional models are compared by comparing the corresponding two-dimensional images. Among these methods, the light field descriptor as described in Non-patent document 3 and the characteristic view as described in Non-patent document 4 are most widely applied model retrieval methods based on two-dimensional images.

In the method described in Non-patent document 3, 10 light field descriptors are used to express the features of a three-dimensional model, while each light field descriptor consists of the features of 10 images. The models are compared through comparison among these light field descriptors. In the generation of two-dimensional images based on a three-dimensional model, a regular dodecahedron is placed at the center of a model, and twenty vertices of the regular dodecahedron are used as viewpoints to generate twenty binary images via quadrature projection, wherein two images taking two vertices at opposite locations as viewpoints are identical, so that ten images are retained, and one light field descriptor is generated based on these ten images. Different images can be obtained by rotating the regular dodecahedron, so as to obtain different light field descriptors. In the method of Non-patent document 3, ten light field descriptors are generated, and two light field descriptors are compared by accumulating distances between matched images. Altogether one hundred images should be applied in the process of obtaining the ten light field descriptors.

In the method based on characteristic view as described in Non-patent document 4, a regular icosahedron is placed at the center of a three-dimensional model, and polygons of the regular icosahedron are segmented to obtain eighty uniformly distributed polygon. The centers of these eighty polygons are then taken as viewpoints to obtain eighty initial views via quadrature projection. Representative views are selected from the initial eighty views for each three-dimensional model. Subsequently on the basis of Bayesian probability theorem, a representative view corresponding to the query image are found out from all the representative views of the models to thereby calculate similarities between the query and the database models.

According to some synthetic documents, retrieval methods based on two-dimensional images can get better retrieval results as compared with retrieval methods based on feature vector and retrieval methods based on topology; refer to Non-patent documents 5 and 6 for details.

However, the aforementioned methods based on two-dimensional images are restricted for practical application due to their huge number of images and hence time consumption in the process of feature extraction and model comparison.

Non-patent document 1: R. Osada, R. Funkhouser, T. Chazelle: Shape distributions. ACM Transactions on Graphics, 21(5), 807-832 (2002).

Non-patent document 2: M. Hilaga, Y Shinagawa, T. Kohmura, T. L. Kunii: Topology matching for fully automatic similarity estimation of 3D shapes. Proceedings SIGGRAPH, 203-212 (2001).

Non-patent document 3: C. Ding-Yun, T. Xiaopei, S. Yute, O. Ming: On visual similarity based 3D model retrieval. Proceedings of European association for Computer Graphics, 22(3), 223-232 (2003).

Non-patent document 4: T. F. Ansqry, J. Vandeborre, M. Daoudi: A framework for 3D CAD models retrieval from 2D images. Annual of telecommunications technologies and tools for 3D imaging. Vol. 60 (11-12), 2005.

Non-patent document 5: P. Shilane, P. Min, M. Kazhdan, T. Funkhouser: The Priceton shape benchmark. Proceedings of the international conference on Shape modeling, 167-178 (2004).

Non-patent document 6: N. Iyer, S. Jayanti, K. Ramani: An engineering shape benchmark for 3D models. Proceedings of ASME IDETC/CIE, 24-28 (2005).

SUMMARY

A three-dimensional model retrieval apparatus, according to an embodiment, includes a model normalizing unit configured to rotate and/or translate a three-dimensional model so that main axis directions of the three-dimensional model are consistent with coordinate axes of a three-dimensional space, and barycenter of the three-dimensional model is consistent with origin of a coordinate system, and a two-dimensional image generating unit configured to project said three-dimensional model respectively in a positive direction and a negative direction of each coordinate axis of said coordinate system to generate a plurality of two-dimensional images. A three-dimensional model retrieval apparatus of an embodiment includes a model describing unit configured to generate a model descriptor of the three-dimensional model from said two-dimensional images and a retrieving unit configured to retrieve, based on said model descriptor, a three-dimensional model which most matches an input query from a model database.

According to an embodiment of the present invention, a process of the three-dimensional model retrieval is markedly reduced, and retrieval efficiency is enhanced.

According to an embodiment, the present invention provides a novel three-dimensional model retrieval technology. In an embodiment of the present invention, a three-dimensional model is firstly rotated and translated to normalize the model, and the normalized model is projected to generate relatively few number of two-dimensional images, from which a descriptor of the three-dimensional model is generated, so as to perform three-dimensional model retrieval base on the descriptor.

The following technical solutions are proposed, in accordance with principles of the present invention.

According to an embodiment of the present invention, a three-dimensional model retrieval apparatus includes a model normalizing means for rotating and/or translating a three-dimensional model so that main axis directions of the three-dimensional model are consistent with coordinate axes of a three-dimensional space, and barycenter of the three-dimensional model is consistent with origin of a system coordinate system; a two-dimensional image generating means for projecting said three-dimensional model respectively in a positive direction and a negative direction of each coordinate axis of said system coordinate system to generate a plurality of two-dimensional images; a model describing means for generating a model descriptor of the three-dimensional model from said two-dimensional images; and a retrieving means for retrieving, based on said model descriptor, a three-dimensional model which most matches an input query from a model database.

According to an embodiment of the present invention, the three-dimensional model retrieval apparatus includes model normalizing that calculates a normal direction of each triangle constituting said three-dimensional model, determines the main axis directions of the three-dimensional model based on distributional information of the normal directions of all triangles, and rotates the three-dimensional model based on the main axis directions.

According to an embodiment of the present invention, the three-dimensional model retrieval apparatus projects in positive direction of each coordinate axis only sampling points whose corresponding coordinate positions are positive, and projects in negative direction of each coordinate axis only sampling points whose corresponding coordinate positions are negative, in said projecting.

According to an embodiment of the present invention, the three-dimensional model retrieval apparatus generates six or less than six two-dimensional images for one three-dimensional model.

According to an embodiment of the present invention, the three-dimensional model retrieval apparatus generates an image descriptor for each of said two-dimensional images, and sets a collection of the image descriptors of all two-dimensional images as the model descriptor of the three-dimensional model.

According to an embodiment of the present invention, the three-dimensional model retrieval apparatus sets two-dimensional images in a same coordinate axis of the three-dimensional model as a pair, matches pairs of two-dimensional images of the query model with pairs of two-dimensional images of the model in the model database, calculates and accumulates distance between the matched pairs of two-dimensional images, and performs the retrieval based on the accumulated distance.

According to an embodiment of the present invention, the three-dimensional model retrieval apparatus takes a two-dimensional image as the query, and said retrieving means calculates, based on the model descriptor of the three-dimensional model in the model database, a distance between the two-dimensional image serving as the query and the three-dimensional model in the model database to perform the retrieval based on the distance.

According to an embodiment of the present invention, a three-dimensional model retrieval method is provided. The three-dimensional model retrieval method includes a model normalizing step of rotating and/or translating a three-dimensional model so that main axis directions of the three-dimensional model are consistent with coordinate axes of a system coordinate system, and barycenter of the three-dimensional model is consistent with origin of the system coordinate system; a two-dimensional image generating step of projecting said three-dimensional model respectively in a positive direction and a negative direction of each coordinate axis of said system coordinate system to generate a plurality of two-dimensional images; a model describing step of generating a model descriptor of the three-dimensional model from said two-dimensional images; and a retrieving step of retrieving, based on said model descriptor, a three-dimensional model which most matches an input query from a model database.

According to an embodiment of the present invention, the three-dimensional model retrieval method includes a feature where a normal direction of each triangle constituting said three-dimensional model is calculated, the main axis directions of the three-dimensional model is determined based on distributional information of the normal directions of all triangles, and the three-dimensional model is rotated based on the main axis directions.

According to an embodiment of the present invention, the three-dimensional model retrieval method includes a feature where in positive direction of each coordinate axis, only sampling points whose corresponding coordinate positions are positive are projected, and in negative direction of each coordinate axis, only sampling points whose corresponding coordinate positions are negative are projected.

According to an embodiment of the present invention, the three-dimensional model retrieval method includes a feature where six or less than six two-dimensional images are generated for one three-dimensional model.

According to an embodiment of the present invention, the three-dimensional model retrieval method includes a feature where an image descriptor is generated for each of said two-dimensional images, and a collection of the image descriptors of all two-dimensional images is set as the model descriptor of the three-dimensional model.

According to an embodiment of the present invention, the three-dimensional model retrieval method includes a feature where two two-dimensional images in a same coordinate axis of the three-dimensional model are set as a pair, pairs of two-dimensional images of the query model are matched with pairs of two-dimensional images of the model in the model database, distance between the matched pairs of two-dimensional images is calculated and accumulated, and the retrieval is performed based on the accumulated distance.

According to an embodiment of the present invention, the three-dimensional model retrieval method includes a feature where said three-dimensional model retrieval method takes a two-dimensional image as the query, and in said retrieving step, a distance between the two-dimensional image serving as the query and the three-dimensional model in the model database is calculated based on the model descriptor of the three-dimensional model in the model database to perform the retrieval based on the distance.

According to an embodiment of the present invention a method of archiving a three-dimensional model includes rotating and/or translating a three-dimensional model so that main axis directions of the three-dimensional model become a coordinate axis of a system coordinate system, and barycenter of the three-dimensional model is consistent with origin of the system coordinate system; projecting said three-dimensional model respectively in a positive direction and a negative direction of each coordinate axis of said system coordinate system to generate a plurality of two-dimensional images; generating a model descriptor of the three-dimensional model from said two-dimensional images; and associating the model descriptor with the three-dimensional model for storage in a database.

According to an embodiment of the present invention, a machine-readable storage medium storing a program that enables an information processing apparatus to execute an operation is provided. The machine readable medium having a program causes an operation including a model normalizing step of rotating and/or translating a three-dimensional model so that main axis directions of the three-dimensional model become a coordinate axis of a system coordinate system, and barycenter of the three-dimensional model is consistent with origin of the system coordinate system; a two-dimensional image generating step of projecting said three-dimensional model respectively in a positive direction and a negative direction of each coordinate axis of said system coordinate system to generate a plurality of two-dimensional images; a model describing step of generating a model descriptor of the three-dimensional model from said two-dimensional images; and a retrieving step of retrieving, based on said model descriptor, a three-dimensional model which most matches an input query from a model database.

According to an embodiment of the present invention, the storage medium stores a program causes an operation including a model normalizing, where a normal direction of each triangle constituting said three-dimensional model is calculated, the main axis directions of the three-dimensional model is determined based on distributional information of the normal directions of all triangles, and the three-dimensional model is rotated based on the main axis directions.

According to an embodiment of the present invention, the storage medium stores a program causes an operation including two-dimensional image generating, in positive direction of each coordinate axis, only sampling points whose corresponding coordinate positions are positive are projected, and in negative direction of each coordinate axis, only sampling points whose corresponding coordinate positions are negative are projected.

According to an embodiment of the present invention, the storage medium stores a program causes an operation including generating an image descriptor for each of said two-dimensional images, where a collection of the image descriptors of all two-dimensional images is set as the model descriptor of the three-dimensional model.

According to an embodiment of the present invention, the storage medium stores a program causes an operation including retrieving two two-dimensional images in a same coordinate axis of the three-dimensional model are set as a pair, pairs of two-dimensional images of the query model are matched with pairs of two-dimensional images of the model in the model database, distance between the matched pairs of two-dimensional images is calculated and accumulated, and the retrieval is performed based on the accumulated distance.

According to the present invention, process amount of the three-dimensional model retrieval is markedly reduced, and retrieval efficiency is enhanced.

SPECIFIC EMBODIMENTS

Specific embodiments of the present invention are described in detail below with reference to the accompanying drawings.

First Embodiment

Figure 1:
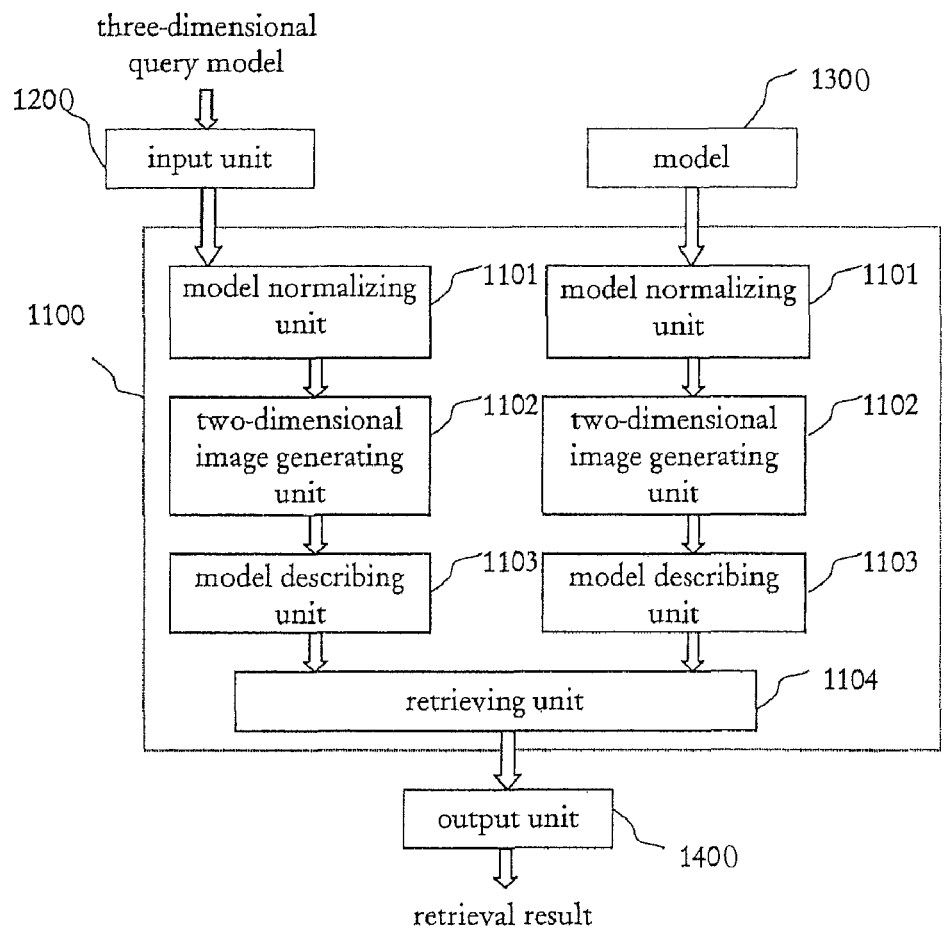
FIG. 1 is a block diagram showing a three-dimensional model retrieval system according to the first embodiment of the present invention.

FIG. 1 is a block diagram showing a three-dimensional model retrieval system according to the first embodiment of the present invention.

In the first embodiment, the three-dimensional model retrieval apparatus 1100 is coupled to an input means 1200, a model database 1300 and an output means 1400. Upon input by a user of a three-dimensional model query via the input means 1200, the three-dimensional model retrieval apparatus 1100 retrieves a three-dimensional model that best matches the inputted three-dimensional model query from the model database 1300 and outputs it via the output means 1400.

The input means 1200 for inputting the three-dimensional model query can be any input means capable of inputting the model query, such as a keyboard, a mouse, a touch panel, a storage medium interface (including magnet disk driver and optical disk driver etc.), a network interface, and so on. The output means 1400 for outputting the retrieval result can be any output means capable of outputting the retrieved three-dimensional model, such as a display, a network interface, a storage medium interface, and so on. The model database 1300 can be formed of as a database established on a memory (including local memory and network memory) that stores great quantities of three-dimensional models.

The three-dimensional model retrieval apparatus 1100 comprises a model normalizing unit 1101, a two-dimensional image generating unit 1102, a model describing unit 1103 and a retrieving unit 1104. The model normalizing unit 1101 rotates and/or translates the three-dimensional model so that main axis directions of the three-dimensional model are consistent with three coordinate axes of a system coordinate system, and the barycenter of the three-dimensional model is consistent with the origin of the system coordinate system. The two-dimensional image generating unit 1102 projects the three-dimensional model respectively in a positive direction and a negative direction of each coordinate axis of the system coordinate system to generate six or less than six two-dimensional images. The model describing unit 1103 extracts features of these two-dimensional images to generate a model descriptor of the three-dimensional model. The retrieving unit 1104 compares the model query with three-dimensional models in the model database 1300 based on the descriptor to determine the most matched model. The final retrieval result is outputted via the output unit 1400.

The three-dimensional model retrieval apparatus 1100 can be realized by means of such information processing apparatuses as a personal computer, a workstation, a PDA (personal digital assistant) and so on. Specifically, the model normalizing unit 1101, the two-dimensional image generating unit 1102, the model describing unit 1103 and the retrieving unit 1104 can be realized via the CPU (central processing unit) and corresponding programs in the information processing apparatus.

The component parts of the three-dimensional model retrieval apparatus 1100 according to the first embodiment are described in greater detail in the following paragraphs.

When the user inputs the three-dimensional model query via the input unit 1200, the model query is firstly transmitted to the model normalizing unit 1101 of the three-dimensional model retrieval apparatus 1100 to be normalized there, so that the main axis directions of the three-dimensional model are consistent with the coordinate axes of the system coordinate system, and the barycenter of the three-dimensional model is consistent with the origin of the system coordinate system to facilitate subsequent process. Generally speaking, the three-dimensional model can be located along a random direction at a random position of the three-dimensional space. In order to carry out the normalizing, it is necessary to translate and rotate the three-dimensional model.

As regards translation, barycentric coordinates of the three-dimensional model are firstly calculated, and the three-dimensional model is then subjected to translational transformation, so that the barycenter of the three-dimensional model becomes the origin of the system coordinate system. Translational transformation of the three-dimensional model can be effected by utilizing any known methods in the art, and detailed explanation thereof is omitted in this paper to concentrate on rotational transformation.

Some methods for rotational normalization of the three-dimensional model have been proposed in the art, such as the principal component analysis: PCA. However, it is found upon experimentation that PCA cannot obtain stable main directions for some similar models.

In view of this, the inventor of the present invention proposes a model normalizing method referred to as Normal-PCA (N-PCA). In this method, main axis directions of the model are firstly extracted, and the three-dimensional model is then normalized by using the extracted main axis directions.

The three-dimensional model is usually composed of triangular lattices, while distribution of the normal direction of the triangle provides direction information of the model. Therefore, in the N-PCA method according to the present invention, distributional information of the normal directions of all triangles in the model is taken into consideration to detect the main axis directions of the model. Detailed description is made below to the process of performing rotational normalization on the three-dimensional model via the N-PCA method.

Firstly, the area $a_i$ and normal direction $\vec{p}_i$ of each triangle $t_i$ are calculated, i=1, 2, ... fCnt, where fCnt indicates the number of triangles contained in the three-dimensional model.

Figure 2:
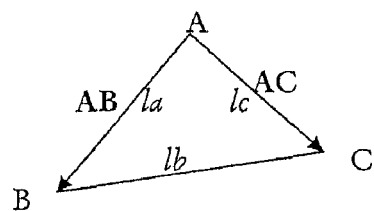
FIG. 2 is a conceptual chart for calculating triangular area and normal direction in accordance with Normal-PCA method in the present invention.

As shown in FIG. 2, suppose the vertices of the triangle $t_i$ are A, B, C, and the lengths of the three sides are la, lb, lc the area $a_i$ of the triangle can be calculated according to the following Equation 1, where s (la+lb+lc)/2, indicating half of perimeter of the triangle, and * indicates multiplying operation.

$$a_i = \sqrt{s*(s-la)*(s-lb)*(s-lc)} \qquad (1)$$

The normal direction $\vec{p}_i$ of the triangle can be obtained via Equation 2, where $\vec{AB}=B-A$, $\vec{AC}=C-A$, indicating directional edges of the triangle $t_i$ as shown in FIG. 2, while x indicates cross multiplying operation of the vector.

$$\vec{p}_i = \vec{AB} \times \vec{AC} \qquad (2)$$

After the normal directions of all triangles are calculated, three main axis directions of the model are obtained from distributional information of the normal directions of the triangles. The process is described in detail below.

Firstly, Equation 3 is employed to calculate a weighted distribution matrix M of the normal directions, where $\vec{p}_0$ indicates an average value of the normal directions, and * indicates multiplying operation of the vector.

$$M = \sum_{i=1}^{fCnt} a_i * (\vec{p}_i - \vec{p}_0) * (\vec{p}_i - \vec{p}_0)^T \qquad (3)$$

The matrix M is subjected to Eigen-decomposition to obtain three eigenvectors and eigenvalues, the three eigenvectors are taken as the main axis directions: $\vec{pa_1}, \vec{pa_2}, \vec{pa_3}$.

Each vertex of the model is normalized according to the following Equation 4, where $\vec{v}_i$ and $\vec{v}_i'\{v'_{ix}, v'_{iy}, v'_{iz}\}$, (i=1, 2, ..., vCnt) respectively indicate the initial $i^{th}$ vertex and the normalized $i^{th}$ vertex, $\vec{c}$ indicates the barycenter of the three-dimensional model before normalizing, · indicates dot multiplying operation of two vectors, and $v'_{ix}$, $v'_{iy}$, $v'_{iz}$ are respectively x, y, z coordinates of the normalized $i^{th}$ vertex $\vec{v_i}'$.

$$v'_{ix}=(\vec{v_i}-\vec{c})\cdot\vec{pa_1}, v'_{iy}=(\vec{v_i}-\vec{c})\cdot\vec{pa_2}, v'_{iz}=(\vec{v_i}-\vec{c})\cdot\vec{pa_3} \quad (4)$$

Figure 3:
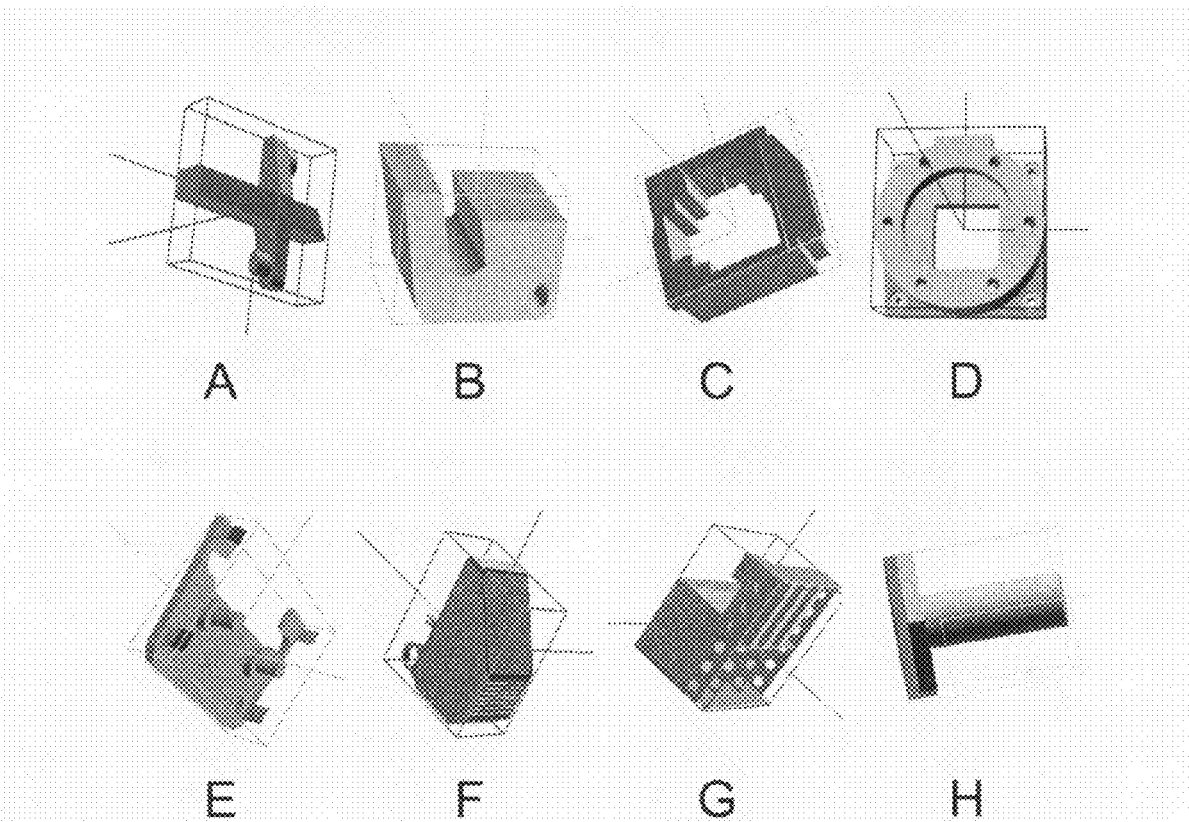
FIG. 3 shows some examples of detection results of main axis directions.

FIG. 3 shows some examples of the normalizing results of some three-dimensional models. Application of the aforementioned N-PCA method makes it possible to precisely and stably detect the main axis directions of the three-dimensional model, and normalizing is performed on the basis thereof. After normalizing, the main axis directions of the model become coordinate axes of the system coordinate system, and the barycenter of the model is also translated to the origin of the coordinate system.

After the three-dimensional model is normalized as described above, the model normalizing unit 1101 transfers the normalized three-dimensional model to the two-dimensional image generating unit 1102 to generate a plurality of two-dimensional images based on the three-dimensional model.

The three-dimensional model is firstly uniformly sampled in the two-dimensional image generating unit 1102.

From a theoretic point of view, the more the sampling points, the more precisely the model will be described. On the other hand, if there are too many sampling points, efficiency of the subsequent processes will be affected. Therefore, the number of sampling points is determined by experimentation to get the balance between preciseness and efficiency.

In order to precisely describe the three-dimensional model, the sampling points should be uniformly distributed on the surface of the three-dimensional model. An improved sampling mechanism is proposed in the present invention to obtain uniformly distributed sampling points. In the sampling, the number of the sampling points in each triangle is proportional to the area of the triangle. All triangles are sampled in sequence; for each triangle, the number of the sampling points is firstly calculated based on the area of the triangle, and the triangle is then sampled according to the method in Non-patent document 1. The sampling method according to the present invention is described in detail below.

Firstly, the surface area $$a_{total} = \sum_{i=1}^{fCnt} a_i$$

of the three-dimensional model is calculated, where fCnt indicates the number of triangles, and $a_i$ is the area of the triangle.

Subsequently, for each triangle $t_i$, i=1, 2, ..., fCnt, a series of sampling points are obtained in accordance with the area and vertices of the triangle.

1) The number of sampling points $nCnt_i = \lceil sCnt*a_i/a_{total} \rceil$ that fall inside the triangle $t_i$ are calculated, where sCnt indicates the total number of the sampling points, and $\lceil \cdot \rceil$ indicates rounding operation.

Figure 4:
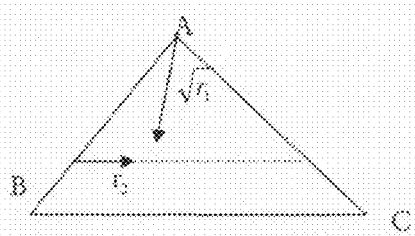
FIG. 4 is a view showing triangular sampling mechanism according to the present invention.

2) Each random sampling point $\vec{p_j}$(j=1, 2, ... $nCnt_i$) is generated according to Equation 5, where $\vec{A}$, $\vec{B}$, $\vec{C}$ are three vertices of the triangle $t_i$ (as shown in FIG. 4), $r_1, r_2 \in [0,1]$ are two random numbers between 0 and 1, and * indicates multiplying operation.

$$\vec{p_j}=(1-\sqrt{r_1})*\vec{A}+\sqrt{r_1}*(1-r_2)*\vec{B}+\sqrt{r_1}*r_2*\vec{C} \quad (5)$$

Figure 5:
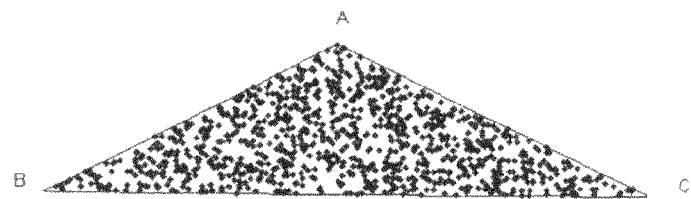
FIG. 5 exemplarily shows triangular sampling result.

FIG. 5 exemplarily shows distribution of the sampling points obtained via the aforementioned method. The sampling points obtained according to this sampling method are uniformly distributed inside the triangle.

After performing the sampling, the two-dimensional image generating unit 1102 projects the sampling points to six different directions to thereby generate six two-dimensional images.

In the two-dimensional image generating unit 1102, the three-dimensional model is projected respectively to the positive direction and the negative direction of each coordinate axis of the system coordinate system, to generate six two-dimensional images. For each two-dimensional image, only about half of the sampling points are made use of. Specifically, for instance, sampling points in the positive direction of the z axis are used only to generate the "top image", while sampling points in the negative direction of the z axis are used only to generate the "bottom image". By the same token, sampling points in the positive direction of the x axis are used only to generate the "right image", while sampling points in the negative direction of the y axis are used only to generate the "left image"; sampling points in the positive direction of the y axis are used only to generate the "front image", while sampling points in the negative direction of the y axis are used only to generate the "back image". Depending on the user's demand, the generated two-dimensional images can be binary images, and can also be gray images.

Generation of the "top image" is taken below as an example to describe the process whereby the two-dimensional image generating unit 1102 generates the two-dimensional images.

Suppose $P=\{p_1, p_2, \ldots p_{cnt}\}$ is a sampling point located above the z axis, and the size of the image is set as N*N.

Suppose the range of the x, y coordinates of this sampling point is $[x_{min},x_{max}],[y_{min},y_{max}]$, step lengths $x_{step},y_{step}$ are calculated according to the following Equation.

$$x_{step} = \frac{x_{max} - x_{min}}{N}, y_{step} = \frac{y_{max} - y_{min}}{N} \quad (6)$$

3) Each sampling point $p_i=\{p_{ix},p_{iy},p_{iz}\}$ i=1, 2, ..., cnt is projected to the corresponding position (j,k) in the "top view". The luminance at the pixel (j,k) is set as 1 to obtain binary images; of course, the luminance can also be weighted by z coordinate at (j,k), to thereby obtain gray images.

Figure 6:
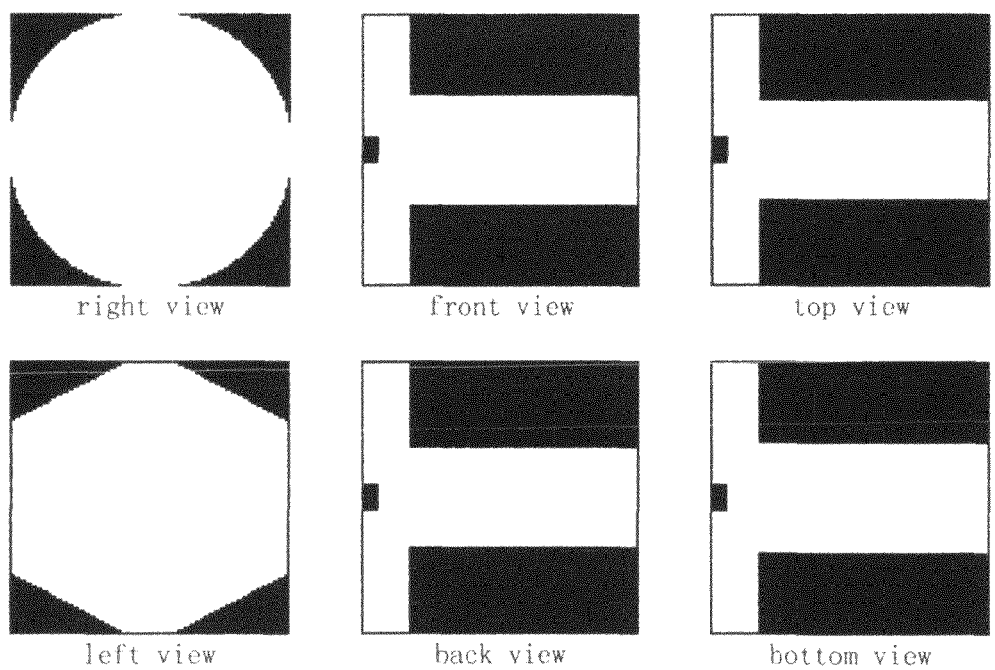
FIG. 6 shows six two-dimensional images generated on the basis of model H in FIG. 3.

The other five images can be obtained in a similar way. FIG. 6 shows six binary images obtained from model H in FIG. 3.

As discussed above, the two-dimensional image generating unit 1102 generate six two-dimensional images from the normalized three-dimensional model, and transfers the generated two-dimensional images to the model describing unit 1103.

The model describing unit 1103 extracts effective features from the six two-dimensional images to thereby obtain a descriptor of the three-dimensional model.

There have currently been many methods for image feature extraction, such as Fourier transformation, descriptor based on curvature scale space (CSS) images, and Zernike moment. In the present invention, Zernike moment is used as an example to describe the six two-dimensional images. This method is well known as efficient for shape feature description. Refer to K. Whoi-Yul, K. Yong-Sung: A region-based shape descriptor using Zernike moments, Signal Processing: Image Communication, vol. 16, page. 95-1102, 12005 for details of this method. The following paragraphs briefly describe the operation whereby the model describing unit 1103 employs the Zernike moment to obtain the descriptor of the three-dimensional model.

The Zernike moment $A_{nm}$ of order (n, m) for a digital image f(x, y) can be calculated according to Equation (7), where m is a non-zero integer and satisfies the two conditions that n−|m| is an even number and |m|≦n; in this context m is a non-negative integer that satisfies the foregoing two conditions; f(x, y) represents the grayscale value of the pixel (x, y); $(x_0, y_0)$ indicates the center of the image; $V_{n,m}(x,y)$ indicates a primary function defined in a unit circle, which constitutes a complete orthogonal basis, and $V_{n,m}^*(x,y)$ is the complex conjugate of $V_{n,m}(x,y)$. It is necessary to normalize the image before calculating the Zernike moment, so that the maximum distance between each point on the image and the center of the image is 1.

$$A_{nm} = \frac{m+1}{\pi} \sum_x \sum_y f(x,y) V_{n,m}^*(x,y), \text{ s.t.} (x-x_0)^2 + (y-y_0)^2 \leq 1 \quad (7)$$

The primary function $V_{n,m}(x,y)$ in Equation (7) is calculated by Equation (8), where $(x_0, y_0)$ indicates the center of the image, $$\rho = \sqrt{(x-x_0)^2 + (y-y_0)^2}, \theta = \tan^{-1} \frac{y-y_0}{x-x_0}$$

represents the polar coordinate to which (x,y) corresponds, and $R_{n,m}(\rho)$ represents the Zernike radial polynomial.

$$V_{n,m}(x,y) = V_{n,m}(\rho,\theta) = R_{n,m}(\rho) e^{jm\theta} \quad (8)$$

The Zernike radial polynomial $R_{n,m}(\rho)$ in Equation (8) is calculated by Equation (9), where ! represents step multiplying operation, and $j=\sqrt{-1}$.

$$R_{n,m}(\rho) = \sum_{s=0}^{(n-|m|)/2} \frac{(-1)^s (n-s)! \rho^{n-2s}}{s!((n+|m|)/2-s)!((n-|m|)/2-s)!} \quad (9)$$

It is possible to calculate the Zernike moment of each order of the image $M = \{A_{00}, A_{10}, A_{20}, A_{22}, A_{31}, A_{33}, \ldots\}$ according to Equation (7), and the modulus of the Zernike moment of each order is taken as the eigenvector. Suppose Order is the Zernike order, the length of the eigenvector will be $$D = \sum_{i=0}^{Order} (\lfloor i/2 \rfloor + 1),$$

where $\lfloor i/2 \rfloor$ represents the integral portion of i/2.

Then, the feature of each image is expressed by using a D-dimensional real vector.

As can be known from the foregoing, the feature of each image is expressed by using a D-dimensional real vector, so that when two images are compared, the comparison can be expressed by the distance between two eigenvectors, such as Euclidean distance and absolute distance, and so on. With $\vec{f_1}$, $\vec{f_2}$ representing the features of two images, the Euclidean distance is $$d = \sqrt{\sum_{i=1}^{D}(f_{1i} - f_{2i})^2},$$

while the absolute distance is $$d = \sum_{i=1}^{D} |f_{1i} - f_{2i}|.$$

Calculations of the Euclidean distance and the absolute distance are well known in the art. In addition, besides employing the Euclidean distance and the absolute distance as distance measurements, such other measurements as correlation can also be employed.

Thus, the modulus of the Zernike moment can be used as the feature for each generated two-dimensional image. The feature has the following characteristics: 1) rotation invariance. The modulus of the Zernike moment is invariant of rotation. 2) Expression efficiency. There is no information redundancy in the feature by using orthogonal basis. 3) Robustness. The feature is insensitive to noise and minor changes in shape. 4) Effectiveness and multi-level representation.

Lower order Zernike moments express global shape information, while higher order moments express details. In comparison with other moments, an image can be described well by a low-dimensional Zernike moments.

Accordingly, it is possible to take a set of Zernike moments of all two-dimensional images generated from a three-dimensional model as the descriptor of the three-dimensional model.

By the operations of the model normalizing unit 1101, the two-dimensional image generating unit 1102 and the model describing unit 1103, descriptors of the query model and the model in the model database are so far respectively obtained, and the descriptors is transmitted to the retrieving unit 1104 to retrieve there a three-dimensional model that matches the input query model best from the model database.

In the retrieving unit 1104, distances between the input query model and all models in the database are calculated based on the descriptors of the three-dimensional models, and the models in the database are ranked according to the distances to obtain a final match list. Detailed explanation thereof is made below.

Figure 7:
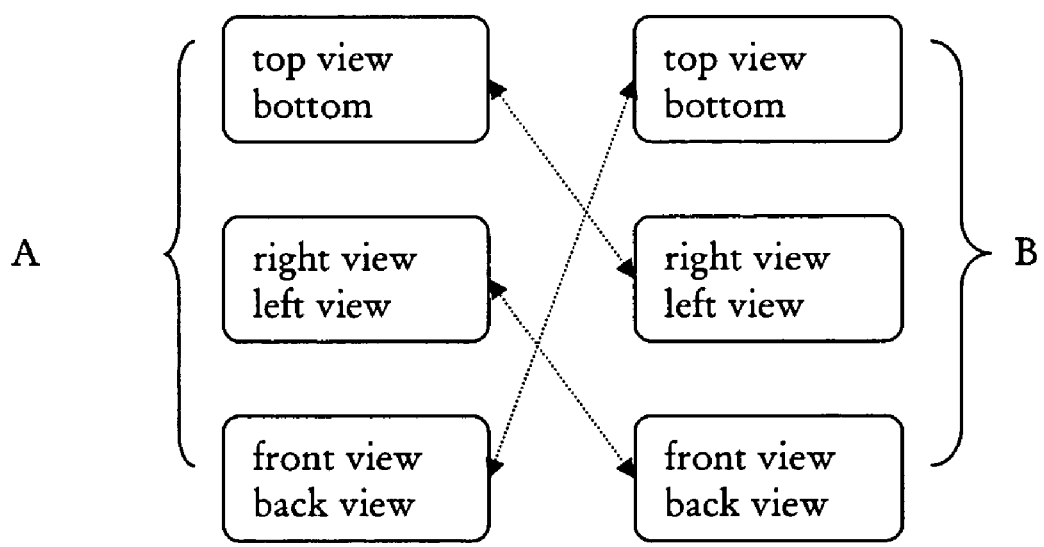
FIG. 7 is a view showing comparison between two models.

The distance between two three-dimensional models is usually obtained by accumulating the distances between the matched images. In the present invention as shown in FIG. 7, six images of each model are firstly divided into three groups, and the distances between the models are then obtained by accumulating the distances between the matched groups of images. Such a matching method is mainly based on the simple fact that the "top view" and the "bottom view", the "left view" and the "right view", and the "front view" and the "back view" always appear in pairs, so that two images in each group should be combined, rather than independently, to exert functions during the process of models comparison.

According to the present invention, comparison between three-dimensional models can be realized by two steps: calculating the distances between each of the image groups of the two models, and determining the correspondence between each of the image groups of the two models to calculate the distance between the two three-dimensional models. Suppose the three image groups of the first model are, respectively: $A_1 = \{$top view, bottom view$\}$, $A_2 = \{$left view, right view$\}$, $A_3 = \{$front view, back view$\}$; the three groups of the second model are, respectively: $B_1 = \{$top view, bottom view$\}$, $B_2 = \{$left view, right view$\}$, $B_3 = \{$front view, back view$\}$, the comparison process of the two models will be as follows:

1. Calculating distances between every two pairs of image groups in the two models:

$D = \{d(A_i, B_j)\}$, i, j=1,2,3. Suppose $A_{i1}$, $A_{i2}$ represent two images in an image group $A_i$, and $B_{j1}$, $B_{j2}$ represent two images in an image group $B_j$, the distance $d(A_i, B_j)$ between $A_i$ and $B_i$ is calculated according to Equation (10), where $l(\bullet,\bullet)$ indicates the absolute distance between the features of the two images, and min( ) is a function for obtaining the minimum value.

$$d(A_i,B_j)=\min(l(A_{i1},B_{j1})+l(A_{i2},B_{j2}),l(A_{i1},B_{j2})+l(A_{i2},B_{j1})) \quad (10)$$

2. In accordance with the following Equation (11), the optimal correspondence function c* is found out by exhaustive searching method to determine the corresponding relationship between each of the image groups of the two three-dimensional models, and calculate the distance dis between the two models.

$$dis = \min_{c \in S} \sum_{k=1}^{3} d(A_k, B_{c_k}), \quad (11)$$

$$S = \{c = \{c_1, c_2, c_3\} \mid c_i \in \{1, 2, 3\} \text{ and } c_i \neq c_j \text{ if } i \neq j\}$$

where c represents the corresponding relationship between each of the image groups of the two models, for instance, c(1)=3 indicates that the first group of images of the first model corresponds to the third group of images of the second model; there are altogether six possibilities, namely:

$c(1) = 1, c(2) = 2, c(3) = 3$ $c(1) = 1, c(2) = 3, c(3) = 2$ $c(1) = 2, c(2) = 1, c(3) = 3$ $c(1) = 2, c(2) = 3, c(3) = 1$ $c(1) = 3, c(2) = 1, c(3) = 2$ $c(1) = 3, c(2) = 2, c(3) = 1$

It is possible to calculate six possible accumulated distances by means of the six possible correspondence functions. The minimum value of the six accumulated distances is taken as the distance between the two models, and the relevant correspondence function is the optimal, namely c.

Thus, the values of the distances between the query model and all three-dimensional modes in the model database 1300 are calculated. As the retrieval result, the retrieving unit 1104 may rank the results of the distance calculation to output the three-dimensional model having the least distance to the model query, or output a plurality of candidates for the user to decide and select.

A particular example is provided below to describe the retrieval based on the Zernike moment.

Figure 10:
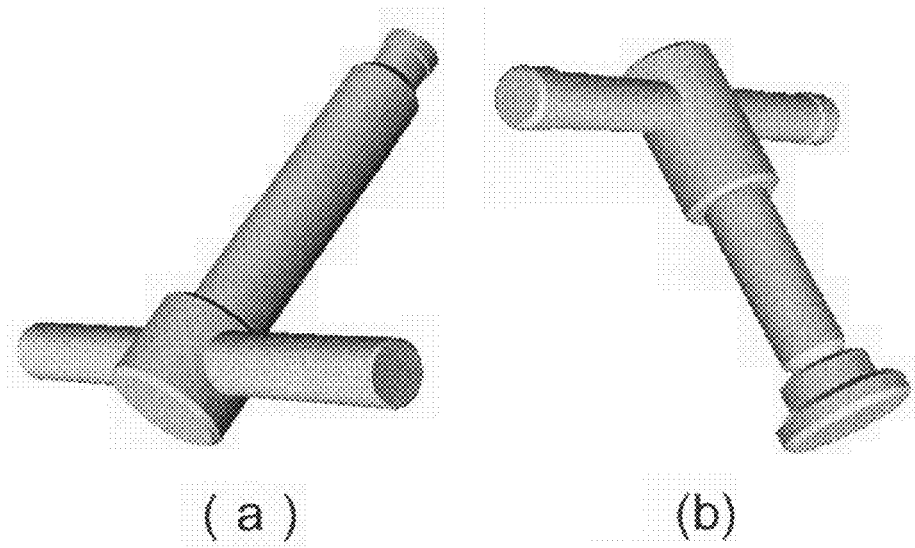
FIG. 10 shows an example of two three-dimensional models to be compared.

FIG. 10 shows two three-dimensional models to be compared, of which the model to the left is hereinafter referred to as a, while the model to the right is referred to as b.

Figure 11:
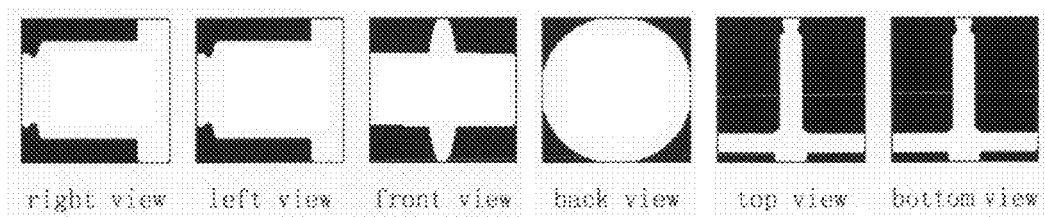
FIG. 11 shows six two-dimensional images generated on the basis of model a in FIG. 10.
Figure 12:
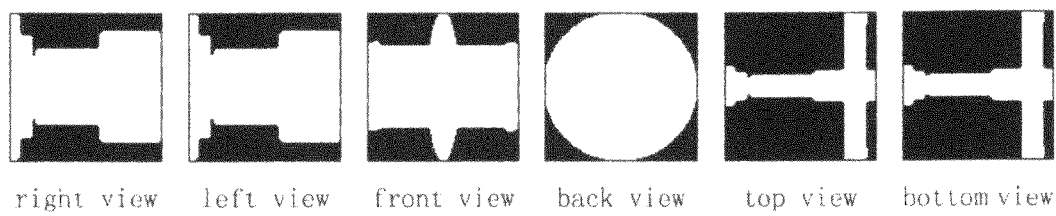
FIG. 12 shows six two-dimensional images generated on the basis of model b in FIG. 10.

FIGS. 11 and 12 respectively show the respective six two-dimensional images of the models a and b. All generated images in this example are binary images, and their sizes are 100*100.

In this embodiment, each two-dimensional image takes the Zernike moment as the feature, and the length of each eigenvector is 36. The absolute distance between eigenvectors is employed to measure the similarity between two images. Table I provides pairwise distances between images of the model, wherein a-left view, a-right view, a-front view, a-back view, a-top view and a-bottom view represent six two-dimensional images generated from the model a, while b-left view, b-right view, b-front view, b-back view, b-top view and b-bottom view represent six two-dimensional images generated from the model b.

TABLE I

|  | a-left view | a-right view | a-front view | a-back view | a-top view | a-bottom view |
|---|---|---|---|---|---|---|
| b-left view | 1.26348 | 1.26159 | 1.120054 | 1.91735 | 3.17818 | 3.17818 |
| b-right view | 1.26272 | 1.26083 | 1.20397 | 1.91773 | 3.17842 | 3.17842 |
| b-front view | 1.41458 | 1.41698 | 0.39089 | 1.86355 | 3.30141 | 3.30141 |
| b-back view | 2.17923 | 2.17500 | 1.68402 | 0.01153 | 4.52542 | 4.52542 |
| b-top view | 3.46439 | 3.46656 | 3.47905 | 4.60464 | 1.23108 | 1.23108 |
| b-bottom view | 3.46451 | 3.46668 | 3.47937 | 4.60471 | 1.23039 | 1.23039 |

According to the model comparison method proposed in the present invention, the six images of each three-dimensional model are firstly divided into three groups as shown in Table II, where $A_1, A_2, A_3$ represent three groups of images of the model a, and $B_1, B_2, B_3$ represent three groups of images of the model b.

TABLE II

| $A_1$ | $A_2$ | $A_3$ | $B_1$ | $B_2$ | $B_3$ |
|---|---|---|---|---|---|
| a-top view | a-right view | a-front view | b-top view | b-right view | b-front view |
| a-bottom view | a-left view | a-back view | b-bottom view | b-left view | b-back view |

Table III lists pairwise distances between the image groups of the two models to describe the calculation method of the distances between the image groups taking image group $A_2$ and image group $B_3$ as examples.

There are altogether two possible matches for the image group $A_2$ and image group $B_3$, {(a-right view, a-front view), (a-left view, a-back view)}, and {(a-left view, a-back view), (a-left view, a-front view)}, wherein the two images within one parenthesis are considered as mutually matched. According to the former match, the distance between two image groups is 3.58958 (1.41458+2.17500), whereas according to the latter match, the distance between two image groups is 3.59621 (2.17923+1.41698). Accordingly, the distance between $A_2$ and $B_3$ is min(3.58958,3.59621)=3.58958. The distances between the other image groups can be obtained by similar calculation.

TABLE III

|  | $B_1$ | $B_2$ | $B_3$ |
|---|---|---|---|
| $A_1$ | 2.46147 | 6.35661 | 7.82683 |
| $A_2$ | 6.93108 | 2.52431 | 3.58958 |
| $A_3$ | 8.08377 | 3.11826 | 0.402421 |

The remained problem is to determine the corresponding relationships between the groups, so as to calculate the distance between the two models. Since each model has three groups of images, there are altogether six possible correspondence between the image groups of the two models. Provided below are all the possible correspondences and the corresponding accumulated distances, wherein the two image groups within one parenthesis are considered as mutually matched.

$\{(A_1, B_1), (A_2, B_2), (A_3, B_3)\}:dis_1 =$
$\qquad 2.46147 + 2.52431 + 0.402421 = 5.388201;$ $\{(A_1, B_1), (A_2, B_3), (A_3, B_2)\}:dis_2 =$
$\qquad 2.46147 + 3.58958 + 3.11826 = 9.16931;$ $\{(A_1, B_2), (A_2, B_3), (A_3, B_1)\}:dis_3 =$
$\qquad 6.35661 + 3.58958 + 8.08377 = 18.02996;$ $\{(A_1, B_2), (A_2, B_1), (A_3, B_3)\}:dis_4 =$
$\qquad 6.35661 + 6.93108 + 0.402421 = 13.690111;$ $\{(A_1, B_3), (A_2, B_2), (A_3, B_1)\}:dis_5 =$
$\qquad 7.82683 + 2.52431 + 8.08377 = 18.43491;$ $\{(A_1, B_3), (A_2, B_1), (A_3, B_2)\}:dis_6 =$
$\qquad 7.82638 + 6.93108 + 3.11826 = 5.388201.$ The distance between models a and b is $\min(dis_1, dis_2, dis_3, dis_4, dis_5, dis_6) = 5.388201$ according to the results calculated above. The optimal correspondence between the image groups is $\{(A_1, B_1), (A_2, B_2), (A_3, B_3)\}$, which is consistent with human visual perception.

As discussed above, the three-dimensional model retrieval apparatus firstly normalizes the three-dimensional model so that the main axis directions of the three-dimensional model are consistent with the coordinate axes of the coordinate system, and that the barycenter of the three-dimensional model becomes the origin of the system coordinate system; the three-dimensional model is then projected respectively to the positive and negative directions of each coordinate axis of the system coordinate system to generate a plurality of two-dimensional images, on the basis of which a model descriptor of the three-dimensional model is generated; subsequently, a three-dimensional model most matching the input query model is retrieved from the model database on the basis of the model descriptor. In comparison with prior art three-dimensional model retrieval apparatuses, the inventive apparatus is capable of greatly reducing computational amount in the retrieval and remarkably enhancing efficiency of the retrieval.

Second Embodiment

The second embodiment of the present invention is described below with reference to FIG. 8.

In the three-dimensional model retrieval apparatus 1100 according to the aforementioned first embodiment, when the user inputs the retrieval request, namely inputs the query model, the query model and the models in the model database are processed to respectively generate descriptors, and the retrieval is performed based on the descriptors. However, this requires processing on the three-dimensional models in the model database every time, thereby causing huge processing amount and leading to low efficiency. Accordingly, in the second embodiment according to the present invention, the three-dimensional models in the model database are processed in advance to generate descriptors of each of the models, and the generated descriptors are associated with the corresponding models and stored in the model database. Upon input by the user of the retrieval request, it suffices to only process the input query model and generate its descriptor, compare the descriptor of this query model with the descriptors stored in the model database to thereby carry out the retrieval. Except these, the structure of the second embodiment is the same as that of the first embodiment. The following description is made only to the differences noted above, while description is omitted as regards the identical portions to avoid repetition.

Figure 8:
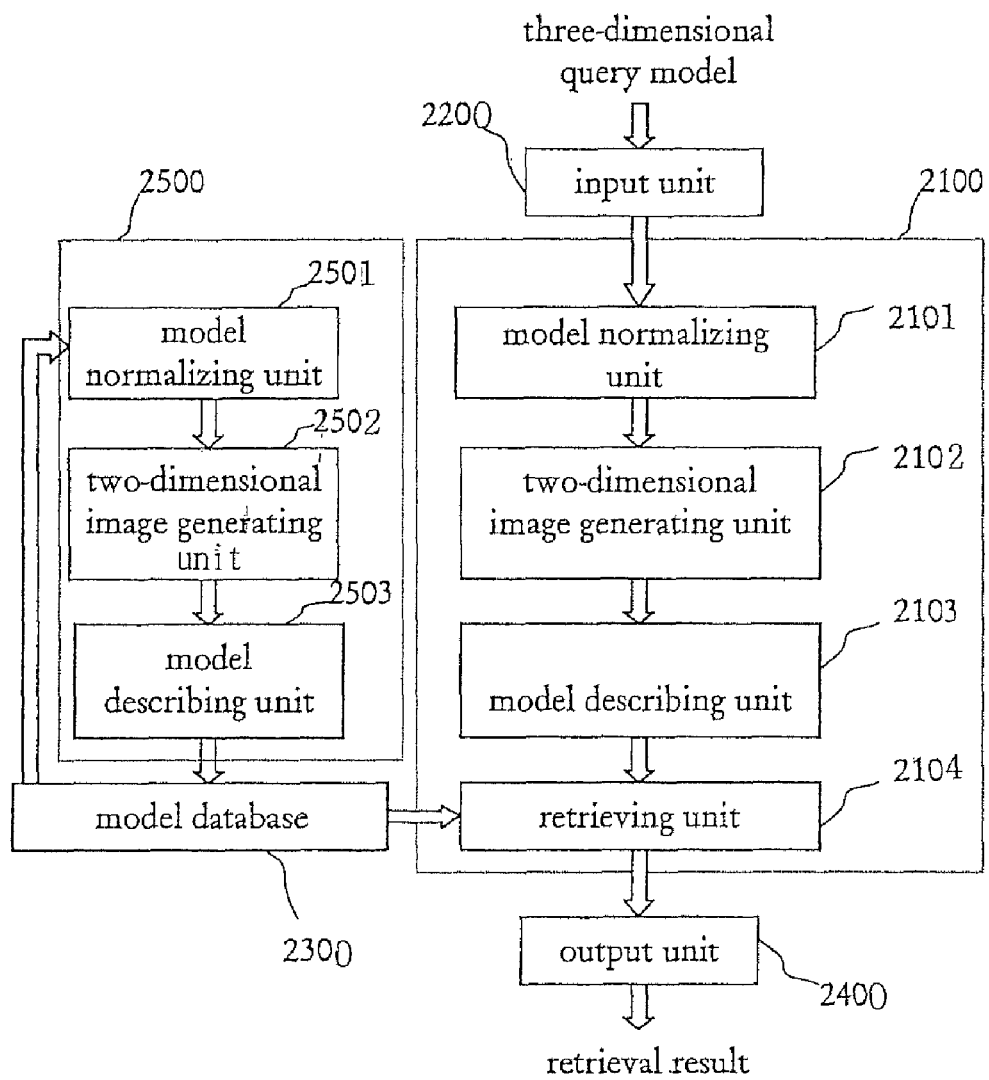
FIG. 8 is a block diagram showing a three-dimensional model retrieval system according to the second embodiment of the present invention.

FIG. 8 is a block diagram showing the three-dimensional model retrieval system according to the second embodiment of the present invention. In the second embodiment, the three-dimensional model retrieval apparatus 2100 is coupled to an input unit 2200, a model database 2300 and an output unit 2400. Upon input by a user of a three-dimensional query model via the input unit 2200, the three-dimensional model retrieval apparatus 2100 processes the input three-dimensional query model by generating a descriptor of the query model, and then retrieves a model descriptor that matches the descriptor of the three-dimensional query model best from the model database 2300 to thereby retrieve a three-dimensional model that most matches the query model, and outputs it via the output unit 2400.

The model database 2300 is coupled to a model database constructing unit 2500, which processes the three-dimensional models in the model database 2300 in advance or whenever new three-dimensional models are added to the model database 2300, to generate corresponding model descriptors, and associate the generated model descriptors with the three-dimensional models for storage back to the model database 2300.

The model database constructing unit 2500 comprises a model normalizing unit 2501, a two-dimensional image generating unit 2502 and a model describing unit 2503. The model normalizing unit 2501, the two-dimensional image generating unit 2502 and the model describing unit 2503 can be respectively identical with the model normalizing unit 1101, the two-dimensional image generating unit 1102 and the model describing unit 1103 of the aforementioned first embodiment. Specifically, the model normalizing unit 2501 normalizes the three-dimensional model in the model database 2300 so that main axes of the three-dimensional model are consistent with three coordinate axes of a system coordinate system, and the barycenter of the three-dimensional model is consistent with the origin of the system coordinate system, and transmits the normalized three-dimensional model to the two-dimensional image generating unit 2502. Subsequently, the two-dimensional image generating unit 2502 projects the three-dimensional model to the positive and negative directions of each coordinate axis of the coordinate system to generate six two-dimensional images, and transfers the generated two-dimensional images to the model describing unit 2503. The model describing unit 2503 calculates the Zernike moments of the two-dimensional images to obtain the descriptor of the three-dimensional model. The generated descriptor is associated with corresponding three-dimensional models and stored in the model database 2300.

The three-dimensional model retrieval apparatus 2100 comprises a model normalizing unit 2101, a two-dimensional image generating unit 2102, a model describing unit 2103 and a retrieving unit 2104. Upon input by a user of a query model via the input unit 2200, the model normalizing unit 2101 rotates and/or translates the query model so that main axis directions of the model are consistent with three coordinate axes of a system coordinate system, and the barycenter of the three-dimensional model is consistent with the origin of the system coordinate system. The two-dimensional image generating unit 2102 projects the normalized query model respectively in a positive direction and a negative direction of each coordinate axis of the system coordinate system to generate six two-dimensional images. The model describing unit 2103 extracts features of these two-dimensional images to generate a descriptor of the query model. The retrieving unit 2104 retrieves, based on this descriptor, a model descriptor that most matches the descriptor of the three-dimensional query model from the model database 2300 to thereby retrieve a three-dimensional model that matches the query model best, and outputs it via the output unit 2400.

According to the second embodiment, respective descriptors are generated in advance for the three-dimensional models in the model database 2300, so that it is unnecessary to process the three-dimensional models in the model database 2300 every time during retrieval, as it suffices to process the query model. This further reduces the processing amount during the retrieval and enhances efficiency of the retrieval.

Additionally, the second embodiment is described above taking the circumstance as an example wherein the three-dimensional models and the descriptors are stored in association with each other in the same model database 2300, but the present invention is not limited thereto, as it is also possible, for instance, to store the three-dimensional models and the model descriptors in different databases, whereby the model retrieval apparatus 2100 accesses the databases in which the model descriptors are stored, retrieves the descriptor that most matches the query model, extracts the corresponding three-dimensional model from the databases in which the three-dimensional models are stored using the retrieved descriptor as the query, and takes the output as the retrieval result.

Third Embodiment

A three-dimensional model is used as the query for retrieval in the aforementioned first and second embodiments, whereas a single two-dimensional image serves as the query in the third embodiment to be discussed later to make use of the distance between the matched images to measure the similarity between the input two-dimensional image query and the models in the database. Except these, the structure of the third embodiment is the same as that of the second embodiment. The following description is made only to the differences noted above, while description is omitted as regards the identical portions to avoid repetition.

Figure 9:
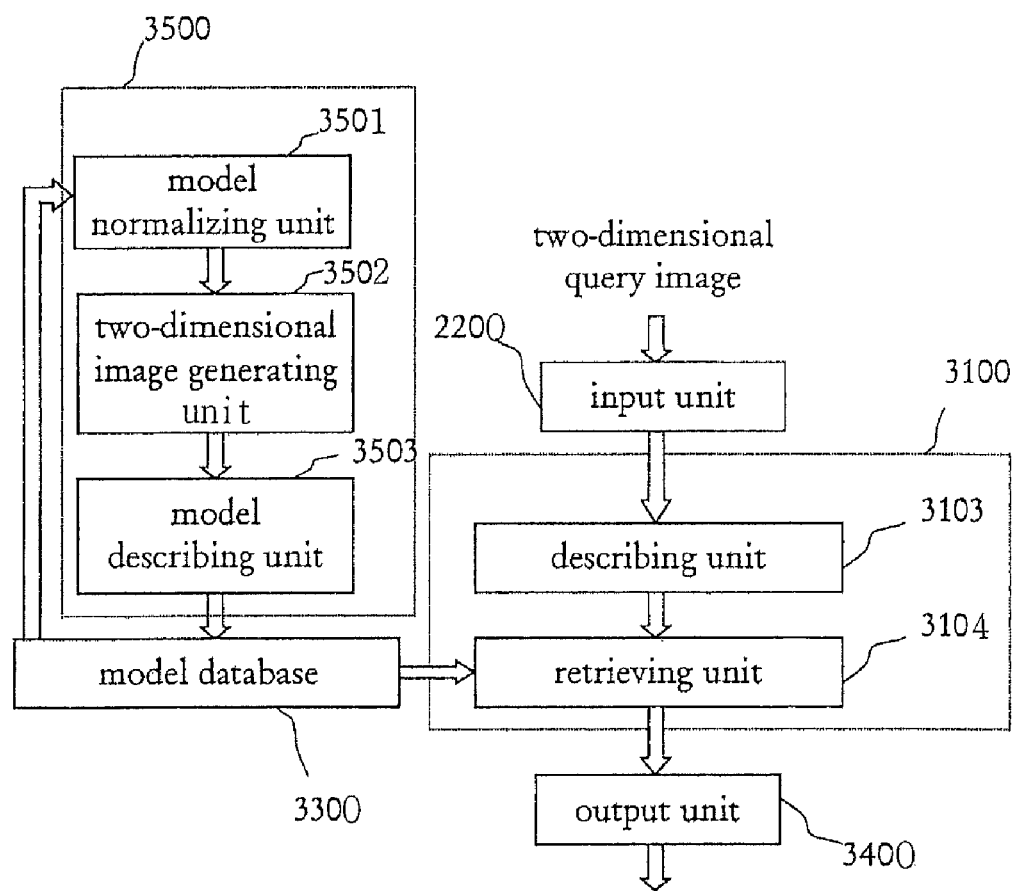
FIG. 9 is a block diagram showing a three-dimensional model retrieval system according to the third embodiment of the present invention.

FIG. 9 is a block diagram showing the three-dimensional model retrieval system according to the third embodiment of the present invention.

In the third embodiment, the three-dimensional model retrieval apparatus 3100 is coupled to an input unit 3200, a model database 3300 and an output unit 3400. Upon input by a user of a two-dimensional image query via the input unit 3200, the three-dimensional model retrieval apparatus 3100 generates a descriptor from the two-dimensional image query, and then retrieves, on the basis of this descriptor, a model descriptor that most matches the descriptor of the two-dimensional image query from the model database 3300 to thereby retrieve a three-dimensional model that most matches the two-dimensional image query, and outputs it via the output unit 3400.

Like the aforementioned second embodiment, the model database 3300 is coupled to a model database constructing unit 3500, which processes the three-dimensional models in the model database 3300 in advance or whenever new three-dimensional models are added to the model database 3300, to generate corresponding model descriptors, and associate the generated model descriptors with the three-dimensional models for storage back to the model database 3300.

The model database constructing unit 3500 comprises a model normalizing unit 3501, a two-dimensional image generating unit 3502 and a model describing unit 3503. The model normalizing unit 3501, the two-dimensional image generating unit 3502 and the model describing unit 3503 can be respectively identical with the model normalizing unit 2501, the two-dimensional image generating unit 2502 and the model describing unit 2503 of the aforementioned second embodiment. Specifically, the model normalizing unit 3501 normalizes the three-dimensional model in the model database 3300 so that main axes of the three-dimensional model are consistent with three axes of a system coordinate system, and the barycenter of the three-dimensional model is consistent with the origin of the system coordinate system, and transmits the normalized three-dimensional model to the two-dimensional image generating unit 3502. Subsequently, the two-dimensional image generating unit 3502 projects the three-dimensional model to the positive and negative directions of each coordinate axis of the coordinate system to generate six two-dimensional images, and transmits the generated two-dimensional images to the model describing unit 3503. The model describing unit 3503 calculates the Zernike moments of the two-dimensional images to obtain the descriptor of the three-dimensional model. The generated descriptor is associated with corresponding three-dimensional models and stored in the model database 3300.

The three-dimensional model retrieval apparatus 3100 comprises a describing unit 3103 and a retrieving unit 3104. Upon input by a user of a two-dimensional image query via the input unit 3200, the describing unit 3103 extracts features of the two-dimensional image query to generate its descriptor. The retrieving unit 3104 retrieves, based on this descriptor, a model descriptor that most matches the descriptor of the two-dimensional image query from the model database 3300 to thereby retrieve a three-dimensional model that most matches the two-dimensional image query, and outputs it via the output unit 3400.

For example, suppose the input two-dimensional image query is I, and $m_i$, i=1, 2, . . . , 6 are six two-dimensional images of a three-dimensional model, the distance between the image query I and the three-dimensional model can be calculated as: $\min(l(I,m_1),l(I,m_2), \ldots, l(I,m_6))$, where l represents the absolute distance between the features of two images, and min( ) is a function for obtaining the minimum value.

It is also possible to input pairs of two-dimensional images as the query, wherein distances between matched image groups are used to measure the similarity of the image query and the three-dimensional models in the model database. Suppose $P=\{p_1,p_2\}$ are two query images, and $A_1, A_2, A_3$ are three groups of images of a model database, the distance between the query image group P and the three-dimensional model will be $\min(\text{dis}(P,A_1), \text{dis}(P,A_2), \text{dis}(P,A_3))$, where dis indicates the distance between two image groups, and min( ) is a function for obtaining the minimum value. The above calculation process is identical with the method described in the first embodiment.

Thus, distances between the query image and all models in the model database 3300 are calculated so as to determine the retrieval result.

According to the third embodiment, it is possible to take a two-dimensional image as the query to retrieve a three-dimensional model, thereby greatly enhancing flexibility of the three-dimensional model retrieval.

Other Embodiments

The present invention is described above with reference to certain specific embodiments of the present invention, but it should be understood that the present invention is not limited to the aforementioned embodiments. The scope of the present invention is defined by the attached claims, while it is possible to make various modifications and improvements within the scope of the claims.

For instance, the aforementioned first to third embodiments are described taking example of the circumstance whereby the three-dimensional model is composed of triangular lattices. However, dependent upon circumstances, it is also possible for the three-dimensional model input in the model retrieval system to be composed of polygons having more than three vertices. In the circumstance the input three-dimensional model is composed of polygonal lattices, the model normalizing unit of the present invention can firstly convert the polygonal lattices into triangular lattices. There are many methods for realizing triangularization of polygons, see, for instance, Joseph O'Rourke: Computational geometry in C (second edition), Cambridge University Press, page. 1-40.

In addition, the present invention is described in the aforementioned embodiments taking example of the circumstance whereby the two-dimensional image generating unit generates six two-dimensional images based on the three-dimensional model, but the present invention is not limited to generating six two-dimensional images, as it is also possible to generate less than six two-dimensional images. For instance, it is unnecessary to generate six two-dimensional images in the case of retrieving three-dimensional models having symmetry, thereby reducing processing amount while increasing processing speed.

The present invention is also not limited to implementation as the three-dimensional model retrieval apparatus described in the aforementioned embodiments, as it can also be implemented as a three-dimensional model retrieval method carried out by the three-dimensional model retrieval apparatus according to the present invention.

The present invention can also be implemented as a method for archiving three-dimensional models, which method comprises the steps of: rotating and/or translating an original three-dimensional model so that main axis directions of the three-dimensional model are consistent with three coordinate axes of a system coordinate system, and barycenter of the three-dimensional model is consistent with origin of the system coordinate system; projecting the three-dimensional model respectively in a positive direction and a negative direction of each coordinate axis of the system coordinate system to generate a plurality of two-dimensional images; generating a model descriptor of the three-dimensional model from the two-dimensional images; and associating the descriptor with the original three-dimensional model for storage in a database.

Additionally, the present invention can also be implemented as a program that enables a computer or other information processing apparatuses to execute the three-dimensional model retrieval method according to the present invention. Specifically, the program of the present invention enables the information processing apparatus to: rotate and/or translate a three-dimensional model so that main axis directions of the three-dimensional model are consistent with coordinate axes of a system coordinate system, and barycenter of the three-dimensional model is consistent with origin of the system coordinate system; to project the three-dimensional model respectively in a positive direction and a negative direction of each coordinate axis of the system coordinate system to generate a plurality of two-dimensional images; to generate a model descriptor of the three-dimensional model from the two-dimensional images; and to retrieve, based on the model descriptor, a three-dimensional model which most matches an input query model from a model database.

Moreover, the present invention can also be implemented as a computer readable storage medium storing the aforesaid program.

Furthermore, it is possible to make proper combinations of each of the aforesaid constituent elements of the present invention within the scope as defined in the claims.

The invention claimed is:

1. A three-dimensional model retrieval apparatus comprising:
at least one processor communicatively coupled with said apparatus including:
a model normalizing unit configured to rotate and/or translate a three-dimensional model so that main axis directions of the three-dimensional model are consistent with coordinate axes of a three-dimensional space, and barycenter of the three-dimensional model is consistent with origin of a coordinate system;
a two-dimensional image generating unit configured to project said three-dimensional model respectively in a positive direction and a negative direction of each coordinate axis of said coordinate system to generate a plurality of two-dimensional images;
a model describing unit configured to generate a model descriptor of the three-dimensional model from said two-dimensional images; and
a retrieving unit configured to retrieve, based on said model descriptor, a three-dimensional model which most matches an input query from a model database, and
where said model normalizing unit calculates a normal direction of each triangle constituting said three-dimensional model, determines the main axis directions of the three-dimensional model based on distributional information of the normal directions of all triangles, and rotates the three-dimensional model based on the main axis directions, and
a weighted distribution matrix of the normal direction is calculated, the matrix is subjected to Eigen-decomposition to obtain three eigenvectors, and the three eigenvector are taken as the main axis directions, and
wherein the matrix is represented $$M = \sum^{fCnt} a_i * (\vec{p_i} - \vec{p_0}) * (\vec{p_i} - \vec{p_0})^T$$

where $\vec{p_0}$ indicates an average value of the normal directions, $a_i$ and $\vec{p_i}$ respectively indicating the area and normal direction of each triangle, fCnt indicates a number of triangles contained in the three-dimensional model, and T indicates a transposing operation of the vector.

2. The three-dimensional model retrieval apparatus according to claim 1, wherein
said two-dimensional image generating unit projects in positive direction of each coordinate axis only sampling points whose corresponding coordinate positions are positive, and projects in negative direction of each coordinate axis only sampling points whose corresponding coordinate positions are negative, in said projecting.

3. The three-dimensional model retrieval apparatus according to claim 1, wherein
said two-dimensional image generating unit generates six or less than six two-dimensional images for one three-dimensional model.

4. The three-dimensional model retrieval apparatus according to claim 1, wherein
said model describing unit generates an image descriptor for each of said two-dimensional images, and sets a collection of the image descriptors of all two-dimensional images as the model descriptor of the three-dimensional model.

5. The three-dimensional model retrieval apparatus according to claim 4, wherein
said retrieving unit sets two-dimensional images in a same coordinate axis of the three-dimensional model as a pair, matches pairs of two-dimensional images of the query model with pairs of two-dimensional images of the model in the model database, calculates and accumulates distance between the matched pairs of two-dimensional images, and performs the retrieval based on the accumulated distance.

6. The three-dimensional model retrieval apparatus according to claim 4, wherein
said three-dimensional model retrieval apparatus takes a two-dimensional image as the query, and
said retrieving unit calculates, based on the model descriptor of the three-dimensional model in the model database, a distance between the two-dimensional image serving as the query and the three-dimensional model in the model database to perform the retrieval based on the distance.

7. A three-dimensional model retrieval method comprising:
at least one processor configured to execute an operation including:
executing a model normalizing operation of rotating and/or translating a three-dimensional model so that main axis directions of the three-dimensional model are consistent with coordinate axes of a three-dimensional space, and barycenter of the three-dimensional model is consistent with origin of a coordinate system;
executing a two-dimensional image generating operation of projecting said three-dimensional model respectively in a positive direction and a negative direction of each coordinate axis of said coordinate system to generate a plurality of two-dimensional images;
executing a model describing operation of generating a model descriptor of the three-dimensional model from said two-dimensional images; and
retrieving, based on said model descriptor, a three-dimensional model which most matches an input query from a model database, and
in said model normalizing operation, a normal direction of each triangle constituting said three-dimensional model, determines the main axis directions of the three-dimensional model based on distributional information of the normal directions of all triangles, and rotates the three-dimensional model based on the main axis directions, and
a weighted distribution matrix of the normal direction is calculated, the matrix is subjected to Eigen-decomposition to obtain three eigenvectors, and the three eigenvector are taken as the main axis directions, and
wherein the matrix is represented $$M = \sum_{i}^{fCnt} a_i * (\vec{p_i} - \vec{p_0}) * (\vec{p_i} - \vec{p_0})^T$$

where $\vec{p_0}$ indicates an average value of the normal directions, $a_i$ and $\vec{p_i}$ respectively indicating the area and normal direction of each triangle, fCnt indicates a number of triangles contained in the three-dimensional model, and T indicates a transposing operation of the vector.

8. The three-dimensional model retrieval method according to claim 7, wherein when executing said two-dimensional image generating operation, in positive direction of each coordinate axis, only sampling points whose corresponding coordinate positions are positive are projected, and
when executing said two-dimensional image generating operation in negative direction of each coordinate axis, only sampling points whose corresponding coordinate positions are negative are projected.

9. The three-dimensional model retrieval method according to claim 7, wherein
in said two-dimensional image generating operation, six or less than six two-dimensional images are generated for one three-dimensional model.

10. The three-dimensional model retrieval method according to claim 7, wherein
in said model describing operation, an image descriptor is generated for each of said two-dimensional images, and a collection of the image descriptors of all two-dimensional images is set as the model descriptor of the three-dimensional model.

11. The three-dimensional model retrieval method according to claim 10, wherein
in said retrieving, two two-dimensional images in a same coordinate axis of the three-dimensional model are set as a pair, pairs of two-dimensional images of the query model are matched with pairs of two-dimensional images of the model in the model database, distance between the matched pairs of two-dimensional images is calculated and accumulated, and the retrieval is performed based on the accumulated distance.

12. The three-dimensional model retrieval method according to claim 10, wherein
said three-dimensional model retrieval method takes a two-dimensional image as the query, and
in said retrieving, a distance between the two-dimensional image serving as the query and the three-dimensional model in the model database is calculated based on the model descriptor of the three-dimensional model in the model database to perform the retrieval based on the distance.

13. A three-dimensional model retrieval method comprising:
at least one processor configured to execute an operation including:
rotating and/or translating a three-dimensional model so that main axis directions of the three-dimensional model are consistent with coordinate axes of a three-dimensional space, and barycenter of the three-dimensional model is consistent with origin of a coordinate system;
projecting said three-dimensional model respectively in a positive direction and a negative direction of each coordinate axis of said coordinate system to generate a plurality of two-dimensional images;
generating a model descriptor of the three-dimensional model from said two-dimensional images; and
associating the three-dimensional model which most matches an input query from a model database, and
where when a normal direction of each triangle constituting said three-dimensional model, determines the main axis directions of the three-dimensional model based on distributional information of the normal directions of all triangles, and rotates the three-dimensional model based on the main axis directions, and a weighted distribution matrix of the normal direction is calculated, the matrix is subjected to Eigen-decomposition to obtain three eigenvectors, and the three eigenvector are taken as the main axis directions, and wherein the matrix is represented $$M = \sum^{fCnt} a_i * (\vec{p_i} - \vec{p_0}) * (\vec{p_i} - \vec{p_0})^T$$

where $\vec{p_0}$ indicates an average value of the normal directions, $\overline{a_i}$ and $\vec{p_i}$ respectively indicating the area and normal direction of each triangle, fCnt indicates a number of triangles contained in the three-dimensional model, and T indicates a transposing operation of the vector.

14. A non-transitory machine-readable storage medium storing a program that enables an information processing apparatus to execute an operation comprising:

executing a model normalizing operation of rotating and/or translating a three-dimensional model so that main axis directions of the three-dimensional model are consistent with coordinate axes of a three-dimensional space, and barycenter of the three-dimensional model is consistent with origin of a coordinate system;

executing a two-dimensional image generating operation of projecting said three-dimensional model respectively in a positive direction and a negative direction of each coordinate axis of said coordinate system to generate a plurality of two-dimensional images;

executing a model describing operation of generating a model descriptor of the three-dimensional model from said two-dimensional images; and retrieving, based on said model descriptor, a three-dimensional model which most matches an input query from a model database, and in said model normalizing operation, a normal direction of each triangle constituting said three-dimensional model, determines the main axis directions of the three-dimensional model based on distributional information of the normal directions of all triangles, and rotates the three-dimensional model based on the main axis directions, and a weighted distribution matrix of the normal direction is calculated, the matrix is subjected to Eigen-decomposition to obtain three eigenvectors, and the three eigenvector are taken as the main axis directions, and wherein the matrix is represented $$M = \sum^{fCnt} a_i * (\vec{p_i} - \vec{p_0}) * (\vec{p_i} - \vec{p_0})^T$$

where $\vec{p_0}$ indicates an average value of the normal directions, $\overline{a_i}$ and $\vec{p_i}$ respectively indicating the area and normal direction of each triangle, fCnt indicates a number of triangles contained in the three-dimensional model, and T indicates a transposing operation of the vector.

15. The storage medium according to claim 14, wherein when executing said two-dimensional image generating operation, in positive direction of each coordinate axis, only sampling points whose corresponding coordinate positions are positive are projected, and when executing said two-dimensional image generating operation in negative direction of each coordinate axis, only sampling points whose corresponding coordinate positions are negative are projected.

16. The storage medium according to claim 14, wherein in said model describing operation, an image descriptor is generated for each of said two-dimensional images, and a collection of the image descriptors of all two-dimensional images is set as the model descriptor of the three-dimensional model.

17. The storage medium according to claim 16, wherein in said retrieving, two two-dimensional images in a same coordinate axis of the three-dimensional model are set as a pair, pairs of two-dimensional images of the query model are matched with pairs of two-dimensional images of the model in the model database, distance between the matched pairs of two-dimensional images is calculated and accumulated, and the retrieval is performed based on the accumulated distance.

* * * * *